No. 869,586. PATENTED OCT. 29, 1907.
J. MEYER.
KNIFE ATTACHMENT FOR CORN CULTIVATORS.
APPLICATION FILED DEC. 6, 1906.
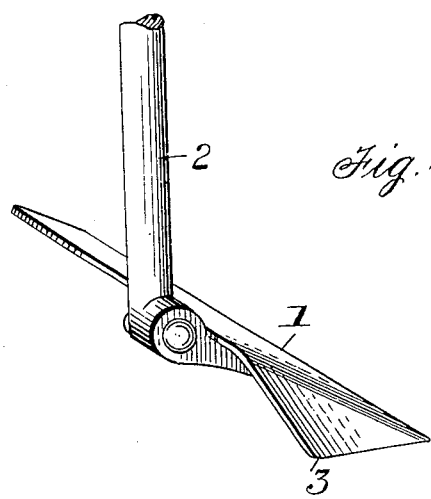
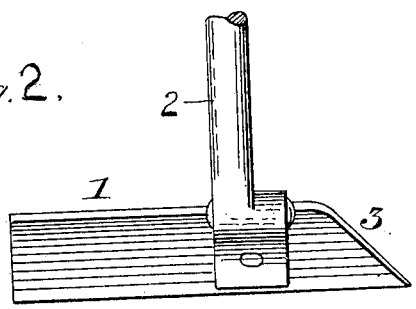
Inventor:
John Meyer,
Witnesses:

UNITED STATES PATENT OFFICE.

JOHN MEYER, OF BLOOMINGTON, ILLINOIS.

KNIFE ATTACHMENT FOR CORN-CULTIVATORS.

No. 869,586.  Specification of Letters Patent.  Patented Oct. 29, 1907.

Application filed December 6, 1906. Serial No. 346,648.

*To all whom it may concern:*

Be it known that I, JOHN MEYER, a citizen of the United States, residing at Bloomington, in the county of McLean and State of Illinois, have invented certain new and useful Improvements in Knife Attachments for Corn-Cultivators, of which the following is a specification.

My invention relates to improvements in knife-attachments particularly for corn cultivators. Its objects are to provide for the ready, expeditious and effective entrance of the knife into the ground and severing the weeds and small roots below the surface simultaneously with the plowing operation, and to these ends said invention consists of a knife of peculiar construction substantially as hereinafter more fully disclosed and specifically pointed out by the claims.

In the accompanying drawing illustrating the preferred embodiment of my invention—Figure 1 is a perspective view thereof, and Fig. 2 is a rear elevation of the same.

In carrying out my invention, I provide a knife 1 rectangular in general outline, and suitably fixed to a standard 2 of the cultivator (not shown) preferably as shown, being set at an obtuse angle thereto for aiding the ready entrance of the knife into the ground. Said knife has the upper corner-edge of its inner end turned or deflected downward and forward as at 3, to incline or slope at about an obtuse angle thereto, and whereby it will be noted that the same is caused to readily enter the ground, doing so at an inclination, and also to engage and cut the roots or weeds likewise at an inclination, thus accomplishing the same with facility and effectiveness, as is obvious.

This implement is therefore simple, economic of manufacture, and effective and expeditious in action.

I claim—

A corn-knife attachment for cultivators of general rectangular outline and means for carrying the same, said knife attachment having its rectangular portion inclined downward and forward with the exception of an end-portion thereof, which end-portion is deflected laterally along an oblique line extending from a lower forward corner edge of said knife upward and rearward to the back edge of said knife, said laterally deflected end-portion having a lower oblique cutting edge.

In testimony whereof I affix my signature, in presence of two witnesses.

JOHN MEYER.

Witnesses:
 JEANETTE YOUNGMAN,
 J. A. KITCHELL.